(12) United States Patent
Chu et al.

(10) Patent No.: US 8,553,714 B2
(45) Date of Patent: Oct. 8, 2013

(54) UNIFIED CONTENTION BASED PERIOD

(75) Inventors: Liwen Chu, San Ramon, CA (US); George Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 274 days.

(21) Appl. No.: 12/797,979

(22) Filed: Jun. 10, 2010

(65) Prior Publication Data

US 2010/0315980 A1    Dec. 16, 2010

Related U.S. Application Data

(60) Provisional application No. 61/185,849, filed on Jun. 10, 2009.

(51) Int. Cl.
    *H04L 12/43*     (2006.01)
    *H04L 12/54*     (2013.01)
    *H04L 12/413*    (2006.01)

(52) U.S. Cl.
    CPC .......... *H04L 12/5695* (2013.01); *H04L 12/413* (2013.01)
    USPC ........... 370/461; 370/462; 370/328; 370/310; 455/550.1

(58) Field of Classification Search
    USPC ........ 370/310, 312, 328, 461, 462; 455/550.1
    See application file for complete search history.

(56) References Cited

U.S. PATENT DOCUMENTS

| | | | |
|---|---|---|---|
| 6,973,052 B2 | 12/2005 | Wang et al. | |
| 7,187,668 B2 | 3/2007 | Kandala | |
| 7,564,826 B2 | 7/2009 | Sherman et al. | |
| 8,098,666 B2 | 1/2012 | Chu et al. | |
| 2004/0002357 A1* | 1/2004 | Benveniste | ................ 455/550.1 |
| 2005/0136833 A1 | 6/2005 | Emeott et al. | |
| 2006/0034199 A1 | 2/2006 | Chu et al. | |
| 2006/0034210 A1 | 2/2006 | Chu et al. | |
| 2006/0126497 A1 | 6/2006 | Na et al. | |
| 2007/0110096 A1 | 5/2007 | Geile et al. | |
| 2007/0171858 A1* | 7/2007 | Grandhi et al. | ................ 370/328 |
| 2008/0112351 A1* | 5/2008 | Surineni et al. | ................ 370/312 |
| 2008/0291873 A1 | 11/2008 | Benveniste | |
| 2010/0176929 A1* | 7/2010 | Ozdemir et al. | ............. 340/10.4 |
| 2010/0220690 A1 | 9/2010 | Majkowski et al. | |
| 2011/0038357 A1 | 2/2011 | Gong | |
| 2012/0120796 A1 | 5/2012 | Chu et al. | |
| 2012/0230262 A1 | 9/2012 | Benveniste | |

OTHER PUBLICATIONS

Sharma, Gaurav et al., "Performance Analysis of Contention Based Medium Access Control Protocols", School of Electrical and Computer Engineering, Purdue University, West Lafayette, IN, No Date, pp. 17.

Han, Bo et al., "Channel Access Throttling for Overlapping BSS Management", Department of Computer Science, University of Maryland, College Park, MD, No Date, p. 1-6.

Chang, Ying. "Cooperation in Clustered Cellular Systems", Ad Hoc Networks 4, (2006), p. 326-358.

* cited by examiner

*Primary Examiner* — Pao Sinkantarakorn
*Assistant Examiner* — Richard K Chang
(74) *Attorney, Agent, or Firm* — Hogan Lovells US LLP

(57) ABSTRACT

A unified contention based protocol is implemented in which a source station within a basic service set selects the protection methodology for data transmission on the communication medium. Utilizing EDCA as a medium access method and maintaining that each transmission opportunity has multiple slots, the source station is provided with the opportunity to select a protection methodology based on the protection environment, which enables transmission opportunity protection without direct PCP involvement.

18 Claims, 3 Drawing Sheets

UNIFIED CONTENTION BASED PERIOD

RELATED APPLICATION

The present application relates to and claims the benefit of priority to U.S. Provisional Patent Application No. 61/185,849 filed Jun. 10, 2009, which is hereby incorporated by reference in its entirety for all purposes as if fully set forth herein.

BACKGROUND OF THE INVENTION

1. Field of the Invention

Embodiments of the present invention relate, in general, to communications between stations in a wireless network and more particularly to methods and systems for unified contention based period transmission opportunity protection.

2. Relevant Background

Within wireless communication systems, a wireless communication device is normally referred to as a station or STA (e.g., a wireless station). Examples of wireless stations (STAs) include a wide variety of wireless communication devices (e.g., computers including laptop computers, PDAs, cell phones, etc.). In addition, various wireless communication systems can be configured to operate using different means of communication (e.g., ad hoc, peer to peer, etc.). The basic building block of a wireless network is a Basic Service Set (BSS) which is a group of STAs that communicate with each other. Communications take place within the area surrounding these stations called a Basic Service Area (BSA). The BSA is defined by the propagation characteristics of the wireless medium.

An Independent BSS (IBSS) is one in which stations can communicate directly with each other and thus must be within direct communication range. Typically, IBSS networks are composed of small numbers of stations set up for a specific purpose or for a short period of time. One common use is to create a short-lived network to support a single meeting in a conference room. Due to the short duration, small size, and focused purpose, IBSSs are sometimes referred to as ad hoc BSS or an ad hoc network. Such small personalized type of ad hoc networks are also referred to as personal or private IBSS networks (PBSS).

In some wireless communication systems, a PBSS coordinator point (PCP) may operate as a central governing communication device to which and through which various other STAs within the wireless communication systems communicate. For example, the PCP may serve as a coordinator of various other STAs within the wireless communication system or BSS, and it may also serve as a gateway to another network (e.g., a wide area network (WAN), the Internet, etc.). Stations communicate among each other via frames on a communication medium, normally a channel.

In addition to data frames that carry information from higher layers, the IEEE 802.11 standard includes management and control frames that support data transfer. These are the frames on which the PCP operates. The IEEE 802.11 standard defines a distributed coordination function (DCF) (later enhanced and referred to as a hybrid coordination function (HCF)) to provide a best-effort service to the medium access control (MAC) layer of the wireless local area network (WLAN). The standard uses a carrier sense multiple access with collision avoidance (CSMA/CA) protocol that includes a distributed contention-based channel access mechanism referred to as enhanced distributed channel access (EDCA). Another means for medium access used in the 802.11 standard is an optional point coordination function (PCF) which is a centralized polling-based channel access mechanism.

DCF constitutes the fundamental access mechanism of the 802.11 standard. According to DCF, a wireless local area network (WLAN) station must sense the medium before initiating the transmission of a packet. If the station senses the medium as idle for a time interval greater than the distributed inter-frame space (DIFS), then the station transmits a packet. Otherwise, the transmission is deferred and a back-off process starts. Specifically, the station initializes and begins decreasing a timer called a back-off counter. As soon as a back-off counter expires, the station is authorized to access the medium. The initial value of the back-off counter is defined as the back-off window, which is a random time interval, uniformly distributed. Given that collision detection is not possible in the WLAN environment, an acknowledgment is used to notify the sending station that the transmitted frame has been successfully received. The transmission of the acknowledgment is initiated at a time interval equal to the short inter-frame space (SIFS) after the end of the reception of a transmitted frame.

In addition to the basic access mechanism the 802.11 standard includes a protection mechanism for dealing with a hidden node problem. This mechanism is based on the exchange of two short control frames: a request to send (RTS) frame is sent by a potential transmitter to receiver and a clear to send (CTS) frame that is sent from the receiver in response to the RTS frame. The RTS and CTS frames include a duration field to specify the time interval necessary to completely transmit the data frames and the related acknowledgment. Other stations can hear either the sender (RTS frame) or the receiver (CTS frames) in order to refrain from transmitting until the data transmission is complete. The effectiveness of the RTS/CTS mechanism depends upon the length of the packet being "protected". Usually a hybrid approach is used, where only packets with a size greater than a threshold (called the RTS threshold) are transmitted with the RTS/CTS mechanism.

EDCA distributes access to the communication medium by using a system of user priorities. A combination of priority values and queues assigns each packet an access category before entering the MAC layer. These access categories differentiate between background, best effort, video and voice which are, in turn, factored into individually prioritizing each packet. EDCA is contention based.

A contention-based protocol (CBP) or period is a communications protocol for operating wireless telecommunication equipment that allows many stations to use the same radio channel without pre-coordination. The "listen before talk" operating procedure in IEEE 802.11 is the most well known contention-based protocol. Using a contention based protocol, multiple independent stations can interact without central control since before attempting to transmit each station checks whether the medium is idle. If the medium is not idle, stations defer to each other and employ, as previously described, an orderly exponential back-off algorithm to avoid collisions.

The next generation manufacturing system (NGMS) draft uses CBP in two forms: PCP-centric CBP and distributed CBP. In the PCP-centric CBP EDCA is used to decrease the possibility of collisions. Each transmit opportunity requires multiple transmission slots. Accordingly, the PCP sends out protection frames before each transmission opportunity to prevent collisions but does so in small sectors. This results in a high overhead due to the omnidirectional protection requirement.

Communication using a RTS/CTS protocol is very narrowly tailored so that other stations in other sectors do not receive either the RTS or the CTS. Accordingly they can and do transmit and receive at the same time. This can result in interference. To resolve this interference, the PCP transmits to each station sector-by-sector informing them whether or not they can transmit. In essence the PCP insures that the targeted station is ready to receive the message and that no other stations will transmit during the active state of the data exchange. Thus interference can be totally avoided when the PCP transmits to all stations. In this type of CBP operations the PCP is always active and requires a great deal of overhead. This is commonly referred to as a PCP-centric mechanism.

In a distributed CBP protocol, EDCA is again used to decrease the possibility of collisions. And again, each transmit opportunity utilizes multiple transmission slots. In this type of CBP each source station transmits a RTS message to the destination station. The destination station replies to a selected source station with a CTS message, resulting in lower overhead. This is good for a short transmit opportunity. However, when the PCP is not actively participating in the transmission, omnidirectional protection is unavailable and thus interference can occur.

During the CBP process in which the PCP is not actively involved, a CBP transmission opportunity may need to have omnidirectional protection based on the station's (source and/or destination) environment. Currently PCP power saving and omnidirectional protection are contradictory. Saving power by allowing the PCP to remain inactive can result in significant collisions between source and destination communications. Alternatively maintaining a PCP-centric CBP protocol requires undue overhead and excessive power use.

A need therefore exists to provide omnidirectional collision avoidance protection without PCP direct involvement. These and other challenges of the prior art are addressed by one or more embodiments of the present invention, hereafter described by way of example.

SUMMARY OF THE INVENTION

According to one embodiment of the present invention, a unified CBP protocol is implemented in which a source station selects a transmission opportunity protection methodology within a communication medium. Utilizing EDCA as a medium access method and maintaining that each transmission opportunity has multiple slots, the source station is provided with the opportunity to select a protection methodology based on the communication environment. Such flexibility in selecting the protection methodology enables transmission opportunity protection without direct PCP involvement.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
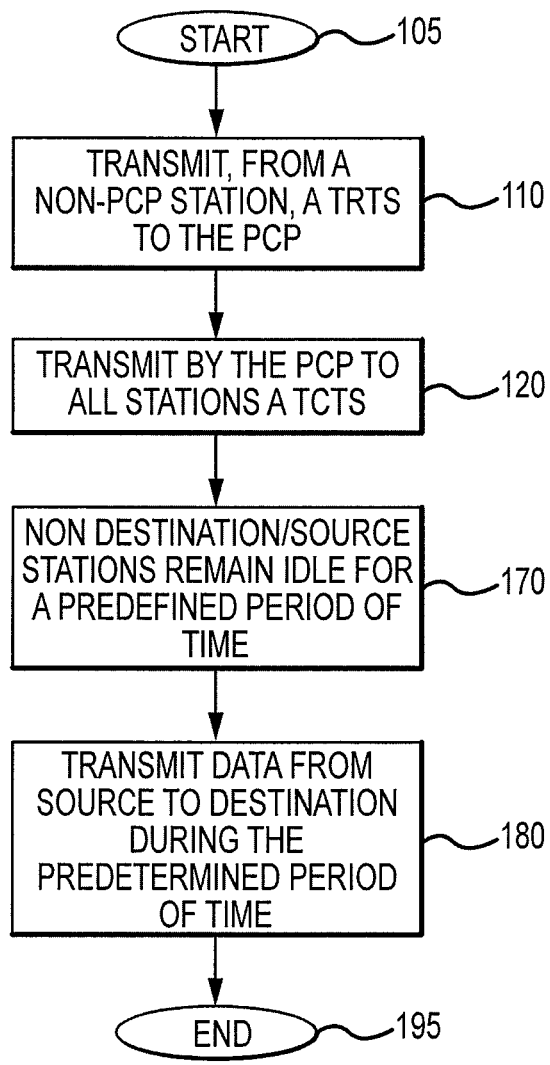
FIG. 1 is a flowchart of one embodiment of a method for PCP-centric protection with non-PCP initiated medium access of data transmissions between a source and a destination according to the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to provide omnidirectional protection without PCP involvement. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

According to one embodiment of the present invention, omnidirectional protection is provided without PCP involvement. This improvement of the prior art is achieved by enabling non-PCP stations to send out omnidirectional RTS/CTS messages to provide transmission protection. As a result, omnidirectional protection is provided without PCP interaction.

FIG. 1 is a flowchart of one embodiment of a method for PCP-centric protection with non-PCP initiated medium access of data transmissions between a source and a destination according to the present invention. To achieve access to the medium the process begins 105 when a non-PCP station transmits 110 a targeted RTS (TRTS) to the PCP. Thus a non-PCP is initiating access to the communication medium. The TRTS includes transmitter (the source), receiver (the PCP) and target (the destination) address information. The PCP then responds 120 with a targeted CTS (TCTS) that is sent to all stations using directional transmissions including to the destination station for which it is intended. Alternatively the TCTS can be transmitted from the PCP using an omnidirectional transmission. Upon receiving the TCTS message each non-destination and non-source station remains idle 170 for a predetermined period of time. It is during this duration field that the data transmission occurs. Similarly, upon receiving the TCTS and TRTS from the PCP the source and destination exchange data 180 during the predetermined period of time free from the risk of collision.

Figure 2:
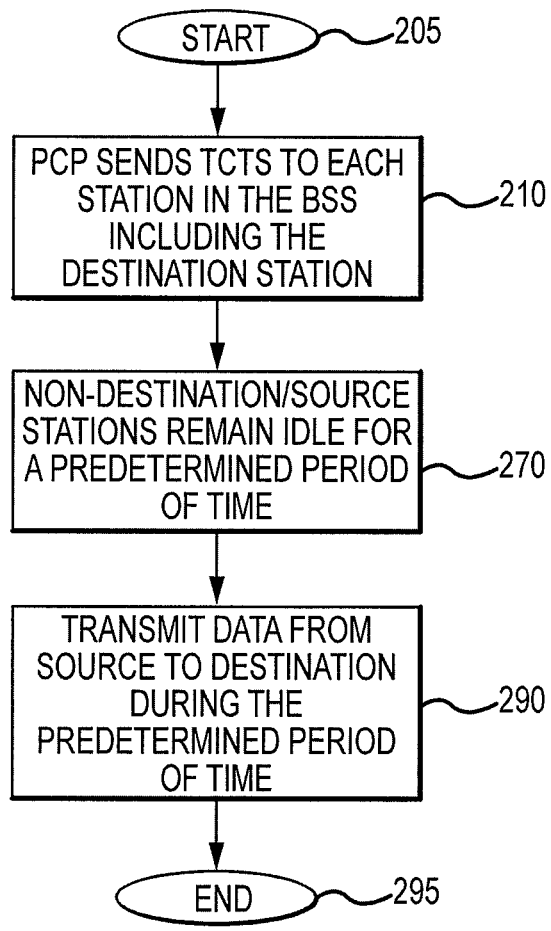
FIG. 2 is a flowchart of one embodiment of a method for PCP-centric protection with PCP initiated medium access of data transmissions between a source and a destination according to the present invention.

FIG. 2 is a flowchart of one embodiment of a method for PCP-centric protection with PCP initiated medium access of data transmissions between a source and a destination according to the present invention. Unlike the previous example in which medium access is initiated by a non-PCP station, in this embodiment of the present invention medium access is initiated by the PCP. The process begins 205 when a PCP sends a TCTS 210 using directional transmissions to each station within the BSS. These transmissions are sent to every station including the destination station and include transmitter (the source), receiver (the PCP) and target (the destination) address and duration field information. Alternatively an omnidirectional transmission can be broadcast from the PCP. The PCP thereafter sends a TRTS message 230 to each station including the destination station using directional transmissions or omnidirectional transmission. After receiving a TRTS message, the destination station responds 250 with a TCTS to the PCP.

Having gained information about an upcoming transmission each non-source and non-destination station remains idle 270 while the source and the destination stations exchange data 290. Upon completion of the data exchange or expiration of the duration field the process ends 295.

Both of the previous two examples demonstrate PCP-centric modes of operation in which the PCP is directly involved in establishing collision protection during the transmission period between a source and a destination. The invention also includes a unified CBP transmit opportunity protection mode which is distributed among the stations in the BSS themselves and absent any direct PCP involvement.

Figure 3:
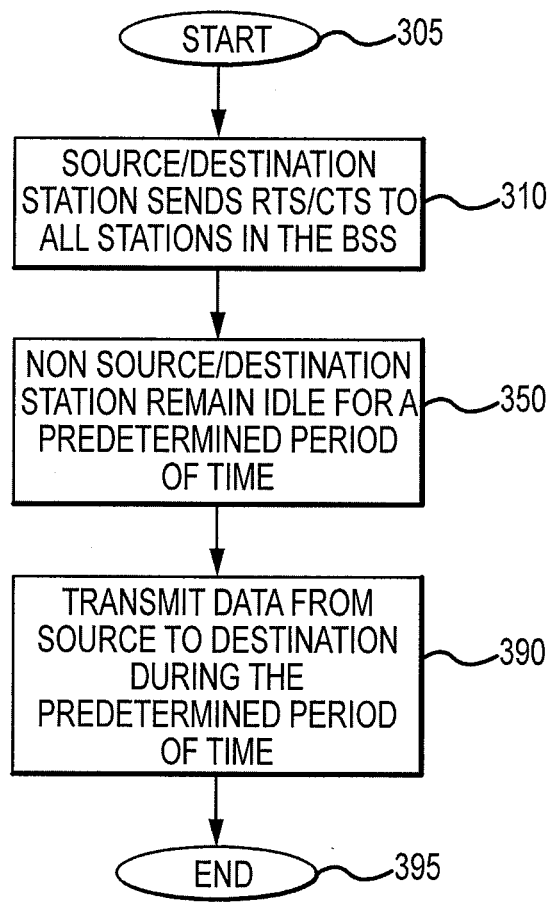
FIG. 3 is a flowchart of one embodiment of a method for distributed RTS/CTS protection of data transmissions between a source and a destination according to the present invention.

FIG. 3 is a flowchart of one embodiment of a method for distributed RTS/CTS protection of data transmissions between a source and a destination according to the present invention. In a distributed mode of operation the source station/destination station sends 310 a RTS or CTS message directly to each station within the BSS initiating access to the medium for the transmission of data. When the destination receives a RTS, it will respond with CTS. Upon receiving either the RTS or CTS non-source/non-destination stations remain idle for the predetermined period of time as identified in the RTS/CTS message. The source/destination station can use a directional transmission to each station or omnidirectional transmissions throughout the BSS. The source station can also send a RTS or TCTS message directly to the destination to protect an upcoming transmission opportunity. When the destination receives a RTS it will respond with a CTS message. In such a protection mode, some stations may not set their NAV, which can result in a collision. The source, after receiving from the destination the CTS message, will begin data transmissions 390 and continue doing so until either the transmission ends or the predefined period for the transmission expires, thus ending 395 the process.

When there is no protection sought for RTS/CTS transmissions, the source station can simply elect to transmit data frames without transmitting either a RTS or receiving a CTS protection frame from the destination. Of course such a mode of operation can result in a collision as the source and destination are only relying on the other stations' ability to sense that the communication is not idle to prevent them from initiating a transmission.

The communication apparatus, and methods employed implemented on those apparatus, described in the present invention is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, 4G, satellite communications, and the like. As such, wireless communication apparatus may provide RF reception functionality, RF transmission functionality, or both (i.e., RF transceiver functionality).

The communication apparatus of the present invention may be configured to implement one or more specific communication protocols or standards including those described in 802.11, as desired. For example, in various embodiments communication apparatus may employ a time-division multiple access (TDMA) standard or a code division multiple access (CDMA) standard to implement a standard such as the Global System for Mobile Communications (GSM) standard, the Personal Communications Service (PCS) standard, and the Digital Cellular System (DCS) standard. In addition, many data transfer standards that work cooperatively with the GSM technology platform may also be supported. For example, communication apparatus may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ECSD), and the high speed circuit switched data (HSCSD) standard, among others.

Embodiments of the present invention have been herein described with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as a data repository.

Those skilled in the art will appreciate that the gateway computer may be located a great geographic distance from the network, and similarly, the devices may be located a substantial distance from the networks. For example, the network may be located in California, while the gateway may be located in Texas, and one or more of the devices may be located in New York. The devices may connect to the wireless network using a networking protocol such as the Transmission Control Protocol/Internet Protocol ("TCP/IP") over a number of alternative connection media, such as cellular phone, radio frequency networks, satellite networks, etc. The wireless network preferably connects to the gateway using a network connection such as TCP or UDP (User Datagram Protocol) over IP, X.25, Frame Relay, ISDN (Integrated Services Digital Network), PSTN (Public Switched Telephone Network), etc. The devices may alternatively connect directly to the gateway using dial connections. Further, the wireless network and network may connect to one or more other networks (not shown), in an analogous manner.

In some preferred embodiments, the present invention can be implemented in software while in others it can be implemented in firmware, hardware or a combination thereof. Software programming code which embodies the present invention is typically accessed by the microprocessor (e.g. of device and/or server) from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory, and accessed by the microprocessor using the bus. The techniques and methods for embodying software programming code in memory, on physical media, and/or distributing software code via networks are well known and will not be further discussed herein.

A user may connect his/her computer to a server using a wireline connection or a wireless connection. Wireline connections are those that use physical media such as cables and telephone lines, whereas wireless connections use media such as satellite links, radio frequency waves, and infrared waves. Many connection techniques can be used with these various media such as: using the computer's modem to establish a connection over a telephone line, using a LAN card such as Token Ring or Ethernet, using a cellular modem to establish a wireless connection, etc. The user's computer may be any type of computer processor, including laptop, handheld or mobile computers; vehicle-mounted devices; desktop computers; mainframe computers; etc., having processing capabilities (and communication capabilities, when the device is network-connected). The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with respect to a unified CBP, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for transmission opportunity protection in a basic service set (BSS) of a wireless network, comprising a personal independent BSS coordination point (PCP) for which there can be time periods when the PCP is not available to transmit messages between stations of the BSS, the method comprising:
    using an Enhanced Distributed Channel Access (EDCA) method for medium access control within the BSS;
    using multiple slots for transmission opportunities;
    determining, by a source station within the BSS, the availability of the PCP for transmitting messages to a plurality of stations within the BSS for protection of a transmission opportunity;
    responsive to the PCP being available, transmitting, by the source station a target request to send (TRTS) message to the PCP;
    responding, by the PCP, to the TRTS with a target clear to send (TCTS) message to the plurality of stations within the BSS;
    receiving at a destination station the TCTS message; and
    transmitting data between the source station and the destination station during the transmission opportunity.

2. The method according to claim 1 wherein the TRTS includes address information regarding the source station, the PCP, and the destination station.

3. The method according to claim 1 wherein the TRTS includes an idle duration field.

4. The method according to claim 1 wherein the TCTS includes an idle duration field.

5. The method according to claim 1 wherein the PCP responds using a directional transmission.

6. The method according to claim 1 wherein non-source stations and non-destination stations remain idle during data transmission between the source station and the destination station.

7. A method for transmission opportunity protection in a basic service set (BSS) of a wireless network, comprising a personal independent BSS coordination point (PCP) for which there can be time periods when the PCP is not available to transmit messages between stations of the BSS, the method comprising:
    using an Enhanced Distributed Channel Access (EDCA) method for medium access control within the BSS;
    using multiple slots for transmission opportunities;
    initiating, by a personal independent BSS coordination point (PCP), a transmission opportunity between a source station and a destination station of the BSS;
    transmitting by the PCP a first target clear to send (TCTS) message to each of a plurality of stations within the BSS including the destination station and the source station;
    transmitting by the PCP a target request to send (TRTS) message to the plurality of stations, including the destination station;
    transmitting by the destination station, in response to the TRTS message, a second TCTS message to the PCP; and
    transmitting data between the source station and the destination station during the transmission opportunity.

8. The method according to claim 7 wherein the TCTS messages include address information regarding the PCP, the source station, and the destination station.

9. The method according to claim 7 wherein the PCP transmits using an omnidirectional transmission.

10. The method according to claim 7 wherein the PCP transmits using a directional transmission.

11. The method according to claim 7 wherein non-source stations and non-destination stations remain idle during data transmission between the source station and the destination station.

12. A method for transmission opportunity protection in a basic service set (BSS) of a wireless network, comprising a personal independent BSS coordination point (PCP) for which there can be time periods when the PCP is not available to transmit messages between stations, the method comprising:
    using an Enhanced Distributed Channel Access (EDCA) method for medium access control within the BSS;
    using multiple slots for transmission opportunities;
    determining, by a source station within the BSS, the availability of the PCP for transmitting to a plurality of stations within the BSS messages for protection of a transmission opportunity;
    responsive to the PCP being unavailable, transmitting by the source station a request to send (RTS) message to each of a plurality of stations within the BSS;
    transmitting, by a destination station, a CTS message to the source station after receiving the RTS message; and
    transmitting data between the source station and the destination station during the transmission opportunity.

13. The method according to claim 12 wherein the source station uses an omnidirectional transmission to transmit the RTS message.

14. The method according to claim 12 wherein the source station uses a directional transmission to transmit the RTS message.

15. The method according to claim 12 further comprising transmitting, by the source station, a CTS message to each of the plurality of stations within the BSS responsive to a lack of the requirement by the destination station to reply with a CTS message.

16. The method according to claim 12 wherein nonsource stations and non-destination stations within the BSS remain idle during data transmission between the source station and the destination station.

17. The method according to claim 12 further comprising transmitting, by the destination station, a clear to send (CTS) message using a directional antenna to the source station after receiving a RTS message.

18. The method according to claim 12 wherein non-source stations and non-destination stations which receive RTS/CTS messages remain idle during data transmission between the source station and the destination station.

* * * * *